US012157026B2

(12) United States Patent
Pipe

(10) Patent No.: US 12,157,026 B2
(45) Date of Patent: Dec. 3, 2024

(54) PROTECTED FIRE PROTECTION SPRINKLER AND TOOL ASSEMBLIES

(71) Applicant: Minimax Viking Patent Management GmbH, Bad Oldesloe (DE)

(72) Inventor: Jed E. Pipe, Byron Center, MI (US)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 0 days.

(21) Appl. No.: 18/566,326

(22) PCT Filed: Jul. 1, 2022

(86) PCT No.: PCT/US2022/035988
§ 371 (c)(1),
(2) Date: Dec. 1, 2023

(87) PCT Pub. No.: WO2023/283142
PCT Pub. Date: Jan. 12, 2023

(65) Prior Publication Data

US 2024/0261615 A1 Aug. 8, 2024

Related U.S. Application Data

(60) Provisional application No. 63/219,004, filed on Jul. 7, 2021.

(51) Int. Cl.
*A62C 37/09* (2006.01)
*A62C 37/14* (2006.01)

(52) U.S. Cl.
CPC .............. *A62C 37/09* (2013.01); *A62C 37/14* (2013.01)

(58) Field of Classification Search
CPC ........ A62C 37/09; A62C 37/14; A62C 31/005
(Continued)

(56) References Cited

U.S. PATENT DOCUMENTS 8,794,340 B2 8/2014 Rekeny
9,320,929 B2 4/2016 Koiwa
(Continued)

FOREIGN PATENT DOCUMENTS

WO WO 2021/077060 4/2021
WO WO 2021/178421 9/2021

OTHER PUBLICATIONS

International Searching Authority, International Search Report and Written Opinion in International Appln. No. PCT/2022/035988, Dec. 16, 2022, 15 pp.

*Primary Examiner* — Cody J Lieuwen
(74) *Attorney, Agent, or Firm* — Perkins Coie LLP

(57) ABSTRACT

Installation and protective devices for a fire protection sprinkler assembly having a support cup disposed about the sprinkler assembly. A protective cap engages the support cup to protect the sprinkler and facilitate its installation. The protective cap has an insertion wall that defines a cup chamber to house the sprinkler therein and protect operational components of the sprinkler during storage, transport, installation and when awaiting to be placed into service. The protective cap includes a plurality of slots formed externally and peripherally to the insertion wall to provide tool access to a tool path between the insertion wall and the inner surface of the support cup. The protective cap includes a shielding wall axially adjacent the insertion wall that circumscribes the central cap axis to shield the slots of the protective cap and the tool path.

27 Claims, 9 Drawing Sheets

(58) Field of Classification Search
USPC .................................................... 169/37–41
See application file for complete search history.

(56) References Cited

U.S. PATENT DOCUMENTS

| | | | | |
|---|---|---|---|---|
| 9,463,343 | B2 | 10/2016 | Koiwa | |
| 9,630,039 | B2 | 4/2017 | Koiwa | |
| 11,691,169 | B2 | 7/2023 | Pipe | |
| 2013/0306334 | A1* | 11/2013 | Koiwa | A62C 35/00 169/51 |
| 2015/0083442 | A1* | 3/2015 | Koiwa | A62C 35/68 169/37 |
| 2015/0136432 | A1* | 5/2015 | Chen | A62C 35/68 169/57 |
| 2017/0296852 | A1 | 10/2017 | Pipe | |
| 2017/0326393 | A1* | 11/2017 | Oldham | A62C 35/68 |

* cited by examiner

PROTECTED FIRE PROTECTION SPRINKLER AND TOOL ASSEMBLIES

PRIORITY DATA & INCORPORATION BY REFERENCE

This application is a 35 U.S.C. § 371 application of International Application No. PCT/US2022/035988, filed Jul. 1, 2022, which claims the benefit of U.S. Provisional Patent Application No. 63/219,004, filed on Jul. 7, 2021, each of which is incorporated by reference in its entirety.

TECHNICAL FIELD

The present invention relates generally to the protection of fire protection sprinklers and more particularly to protected sprinkler assemblies for protecting operational components of the sprinkler and tools for installing and handling of the protected sprinkler assemblies.

BACKGROUND ART

Fire protection sprinklers generally include a sprinkler frame for installation with the inlet of the sprinkler frame connected to a firefighting fluid supply pipe and a fluid deflection member coupled to the frame for distributing firefighting fluid discharged from the sprinkler frame outlet. Automatic fire protection sprinklers include a seal assembly disposed in the frame outlet for controlling the fluid discharge and a thermally responsive trigger arrangement to support the seal and define an unactuated state of the sprinkler. Concealed sprinklers include a cover plate assembly for concealing the installed sprinkler from view.

One particular form of automatic concealed sprinkler is a drop-down flat plate concealed sprinkler. In such an arrangement, the trigger and deflector are concealed between a support cup and the cover plate assembly that is secured to the support cup. The support cup is centered over the sprinkler frame with a corrugated annular wall surrounding the sprinkler frame. The cover plate assembly includes a retainer ring and a cover plate that is secured to the retainer ring by a thermally responsive solder. The retainer ring engages the annular wall of the support cup to secure the cover plate assembly to the support cup and conceal the deflector and trigger component between the support cup and the cover plate assembly. The cover plate supports the deflector in a retracted position. When in the presence of a sufficient level of heat, the cover plate solder fuses, and the cover plate separates from the retainer ring thereby permitting the deflector to drop down and expose the sprinkler trigger for sprinkler operation. Examples of a drop-down concealed sprinkler are shown and described in U.S. Pat. No. 8,794,340 and U.S. Patent Publication No. 2017/0296852.

The cover plate assembly also conceals the sprinkler assembly tool engagement features of the sprinkler frame thereby making handling and installation of the sprinkler difficult. Accordingly, when installing the sprinkler, the cover plate assembly can be removed to expose the sprinkler frame for tool access. However, by exposing the sprinkler frame for handling, the operational components are also exposed and subject to possible damage. If the installation is completed without damage to the sprinkler, the cover plate assembly is reattached to the support cup. Because the cover plate assembly employs a soldered arrangement, the cover plate alone does not provide the best protection for the deflector and other operational components of the sprinkler when storing, transporting or handling of the sprinkler or when waiting to place the sprinkler into service.

There are known protective devices or caps that are used to protect concealed sprinklers. Example of such protective caps are shown and described in U.S. Pat. Nos. 9,320,929, 9,463,343 and 9,630,039. These protective caps remain in place during handling and installation providing tool access even when in place. Moreover, these patent documents describe tools that cooperate with the protective caps to install the protected sprinkler or to remove the protective cap. However, these known protective devices have a complex construction which can make their use difficult or at least make the installation and use of the protected sprinkler cumbersome.

For example, U.S. Pat. No. 9,463,343 shows and describes a protective cap that includes an inner cylinder and outer cylinder that are concentrically joined to one another in a dual wall arrangement. The protective cap is inserted into a cylindrical member or support cup disposed about the sprinkler so that the inner cylinder of the protective cap surrounds the sprinkler. The inner cylinder of the protective cap includes axial extending tongue portions that extend through openings formed in the flat end of the support cup that is disposed over a polygonal tool engagement portion of the sprinkler. The inner and outer cylinders are connected by connecting side surfaces that run axially between the tongues. In order to install the protected sprinkler, an installation tool must be navigated outside the inner cylinder in the space or openings between the inner and outer cylinders, along the tongues and between the side connectors and through the opening of the flat end of the support cup so that the rotation of the tool results in the simultaneous rotation of the protective cap, support cup and the sprinkler. One problem with this dual wall protective cap is the need to adjust and possibly readjust the tool to ensure that the installation tool is properly navigated through openings in each of the cap and the support cup in order to rotate the sprinkler.

Each of U.S. Pat. Nos. 9,463,343 and 9,630,039 describe other protective caps formed as a single wall or cylinder in which the inserted end of the protective cap has axially extending projection member portions or tongues that extend through the opening formations in the end of the surrounding sprinkler support cup. U.S. Pat. No. 9,630,039 also describes protective caps in which the inserted end does not engage the openings formed in the end of the support cup and is instead located inside the support cup spaced from the end of the support cup. Regardless of the construction of the insertion end of the protective cap, the opposite or lower end of the protective caps in U.S. Pat. Nos. 9,463,343 and 9,630,039 include radially arranged and angularly spaced holes or openings into which an installation tool is inserted for the simultaneous rotation of the protective cap, the support cup and the sprinkler. In these protective caps, the number and position of the holes in the lower end of the cup correspond to the number and position of the openings formed in the end of the support cup. U.S. Pat. No. 9,630,039 describes the holes in the cap as being a guide for the installation tool to the openings in the support cup in the absence of axially extending projections or tongues at the insertion end. U.S. Pat. No. 9,630,039 further describes using a transparent film to adjust and visually confirm alignment between the holes of the cap and the openings in the support cup, which can add a complexity to the construction and use of the protective cup. Another protective cap shown in U.S. Pat. No. 9,630,039, when affixed about the sprinkler, is spaced radially inwardly from the internal surface of the support cup. The gap between the protective cap and the inner surface of the support cup can expose the inner surface of the support cup to external elements such as, for example, paint spray during installation or construction operations. Paint on the interior of the support cup can interfere with the proper installation and/or operation of a cover plate assembly.

International Patent Publication No. WO 2021/178,421 shows and describes a protective cap invented by the named inventor of the instant application for protection of a fire protection sprinkler in cooperation with a support cup. The protected sprinkler assembly includes a fire protection sprinkler having a frame and a fluid deflector coupled to the frame. The support cup of the assembly has an end cap with a central opening and a plurality of apertures arranged about the central opening that is disposed about the sprinkler body. The support cup includes an open receiving end opposite the end cap to define a cup chamber. The protective cap of the assembly includes a tubular member having a first end, an opposite second end, and an internal baffle spaced from the first end to define a cap chamber centered about a cap axis. The protective cap is engaged with the support cup so as to combine the cup chamber and cap chamber in fluid communication with one another to define an internal volume of the protected sprinkler assembly between the end cap and the internal baffle for housing operational components of the sprinkler. The internal baffle defines a plurality of slots in fluid communication with the internal volume to form a tool path extending therethrough. The limited access that the slots provide to the internal volume may still be undesired, particularly for some painting or finishing operations that may involve spray in the direct line of the slots. Accordingly, there still remains a continuing need for simplified and different configurations of protective devices and tools for the protection, handling, installation, and storage of fire protection sprinklers and in particular, protective devices and tools for the protection of automatic concealed fire protection sprinklers.

DISCLOSURE OF INVENTION

Preferred protective and installation devices provide for a protected fire protection sprinkler assembly. Preferred assemblies include a fire protection sprinkler having a sprinkler frame with a body and a tool engagement portion for coupling to a fluid supply pipe and fluid deflection member coupled to the sprinkler frame. A support cup is disposed about the sprinkler body so as to radially surround the fluid deflection member. The support cup includes an end cap that preferably defines a plurality of apertures. A preferred protected sprinkler assembly includes a fire protection sprinkler having a frame and a fluid deflector coupled to the frame. The frame includes a body defining an inlet, an outlet and an internal passageway extending along a sprinkler axis from the inlet to the outlet. A support cup having an end cap with a central opening and a plurality of apertures arranged about the central opening is disposed about the body. The support cup includes a wall structure centered about a central cup axis having an open receiving end opposite the end cap to define a cup chamber. The apertures are preferably angularly spaced about the cup axis to define a first arc length about the cup axis between two angularly adjacent spaced apertures. The protected sprinkler assembly includes a preferred protective cap.

The preferred protective cap includes an insertion end portion spaced from the end cap and having a first wall centered and at least partially circumscribed about a central cap axis to define at least a first diameter and a first end of the protective cap. The first wall has a first portion and preferably a second portion. The preferred protective cap also includes a shielding end portion having a second wall centered and circumscribed about the cap axis to define a second end of the cap and a second diameter greater than the first diameter. The second wall is preferably axially adjacent the first portion of the first wall to define at least one cup engagement shelf. The second wall is also preferably axially adjacent the second portion of the first wall to define at least one slot peripheral and external to the first wall and radially between the first wall and the second wall. The preferred protective cap includes an internal baffle disposed perpendicular to the central cap axis separating the insertion end portion and the shielding end portion. The internal baffle is preferably contiguous with the first wall to define a cap chamber centered about the cap axis. In the preferred protected sprinkler assembly, the protective cap engages the support cup with the insertion end portion within the cup chamber to house the fluid deflection member and the thermally responsive element within the cup chamber between the internal baffle of the protective cap and the end cap of the support cup. A tool path is preferably defined between the second portion of the first wall and the inner or internal surface of the support cup. The peripheral slot provides axis to the tool path and the second wall preferably shields the peripheral slot to minimize or prevent debris from entering the slot and the tool path.

Accordingly, a preferred embodiment of a protective cap is provided for a fire protection sprinkler having a sprinkler frame, a fluid deflection member, a thermally responsive trigger, and a support cup disposed about the sprinkler frame. The protective cap preferably includes an insertion end portion for engaging the support cup. The insertion end portion has a first wall centered and at least partially circumscribed about a central cap axis to define a cup chamber for housing at least the fluid deflection member and the thermally responsive trigger. The first wall has a first portion defining a first diameter of the cup chamber and preferably a second portion defining a second diameter of the cup chamber that is less than the first diameter. The protective cap also preferably includes a shielding end portion axially adjacent the insertion portion. The preferred shielding end portion has a second wall centered and circumscribed about the cap axis to define a plurality of preferably closed-formed slots disposed peripherally outside the cup chamber. By locating the slots outside the cup chamber, preferred embodiments of the protective cap and protected sprinkler assembly eliminate or minimize exposure of operational components of the sprinkler housed within the internal volume of the protected sprinkler assembly.

A preferred method of protecting a sprinkler assembly is also provided in which the sprinkler assembly has a frame, a thermally responsive trigger, a fluid deflector and a support cup disposed about the frame. The support cup preferably includes an end cap with a central opening centered about a cup axis and disposed about the sprinkler frame. The end cap preferably includes a plurality of apertures angularly spaced about the central opening to define an arc length about the cup axis between two angularly spaced adjacent apertures. The preferred method includes engaging a first portion of an insertion wall of a protective cap with the support cup to house the thermally responsive trigger and fluid deflector within a cap chamber defined by the first wall at least partially circumscribed about a central cap axis; and defining a tool path between a second portion of the insertion wall and the support cup that is axially accessible by a closed-formed slot located outside the cap chamber and peripheral to the first wall.

Preferred embodiments of the sprinkler frame include a body with an external thread and a wrench boss tool engagement portion defined by a periphery formed by several flat surfaces formed below the external thread. In a preferred embodiment of the sprinkler, the tool engagement member includes a driver member disposed about the sprinkler body and secured to the interior of the surrounding support cup. The driver member includes a central opening through which the frame body extends so that the wrench boss engages the central opening. The central opening of the driver member is defined by adjacent flat surfaces that form two or more surface contacts with the wrench boss of the sprinkler body. The driver member also includes a group of blade formations angularly spaced apart from one another around the central opening. The space formed between adjacent blade members defines a tool engagement slot. The driver member is rotationally oriented within the support cup so as to axially align one or more of the tool engagement slots with an aperture of the support cup. In preferred embodiments of the protected sprinkler assembly, by axially spacing the protective cap from the support cup and the driver member, the preferred protective cap avoids interference with the alignment and engagement of tools with the support cup and driver member.

Preferred embodiments of the sprinkler are configured as a drop-down sprinkler for protection in the protected assembly. The preferred sprinkler includes a frame having a pair of spaced apart frame legs extending axially away from the body in which each preferably terminates in a cantilever at a fixed distance from the body. A through bore extends axially through each cantilever to house a pin member laterally outside of the frame leg in a sliding engagement. A fluid deflection member is affixed to the ends of the pin members for axial translation with respect to the sprinkler frame to define a preferred drop-down arrangement.

Preferred embodiments of the sprinkler assembly provide for a protected concealed sprinkler assembly that includes a surrounding support cup including a wall having an end cap and a receiving end axially spaced from the end cap. One of a preferred protective cap or a cover plate assembly can be engaged with the support cup. A preferred automatic fire protection sprinkler is received within the receiving end of the support cup. The preferred sprinkler includes a fluid deflection member, a seal assembly, and a thermally responsive trigger assembly. The seal assembly is preferably supported in the outlet of the sprinkler body by the thermally responsive trigger assembly which is preferably aligned along the sprinkler axis. The sprinkler includes a pair of pins with each pin being housed in one of the through bores of the frame arms in a sliding engagement to define a retracted position and a deployed position of the fluid deflection member of the sprinkler with one of the protective caps or cover plate assembly supporting the fluid deflection member in the retracted position.

A preferred tool for use with the preferred protected sprinkler assemblies includes a sprinkler wrench. The sprinkler wrench includes a base and two or more spaced apart extension members that extend axially from the base. The wrench is inserted into the protected sprinkler assembly along the preferred tool path. The wrench is further inserted axially so that one or more projection members formed at the end of the extension members engage one of the tool engagement portions of the sprinkler and an aperture of the support cup. With the wrench engaged with the driver member, rotation of the wrench can torque the sprinkler frame into a pipe fitting through the surface contact between the frame and the driver member. The interconnection between the support cup and each of the driver member and the protective cap rotates the driver member and the cap with rotation of the engaged wrench.

Other preferred embodiments of a tool configured to cooperate with the protected sprinkler assembly include projections that extend laterally from one or more of the extension members of the tool. The laterally extending projections are configured to form a preferred engagement notch with the extension member for engaging a terminal end of the insertion end of the protective cap. The engagement between the tool and the protective cap locates the tool for removal of the protective cap by either withdrawing the protective cap from the support cup axially or rotationally.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1A:
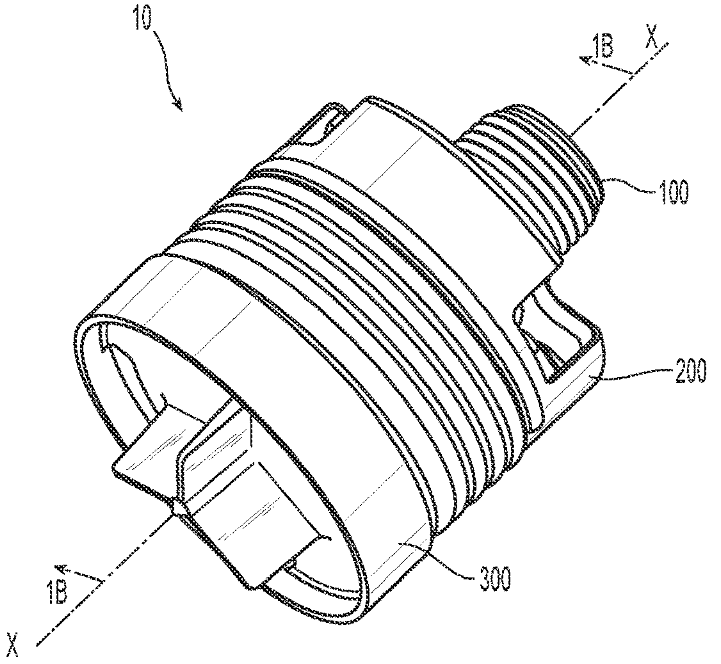
FIG. 1A is a perspective view of a preferred embodiment of a protected sprinkler assembly.

Shown in FIG. 1A is a preferred protected sprinkler assembly 10 for installation. The assembly 10 protects a sprinkler 100 and a surrounding support cup 200 with a preferred removable protective cap 300 that is inserted and engaged within the support cup 200. Generally, the protective cap 300 includes a preferred cap chamber to house operational components of the sprinkler 100 to provide protection against adverse elements and accidental or unintended impact during storage, and handling, including during transport and installation. Moreover, the preferred protected assembly 10 is configured for installation, adjustment, and/or removal of the sprinkler 100 with the protective cap 300 in place to respectively connect, reposition and/or disconnect the protected sprinkler 100 with respect to a fluid supply pipe fitting. Accordingly, the preferred protective cap 300 is configured to cooperate with one or more tools for connecting the sprinkler 100 to, or disconnecting the sprinkler 100 from, a fluid supply pipe fitting. In a preferred aspect, the protective cap 300 defines a preferred tool path between the inserted portion of the protective cap and the support cup to access a tool engagement portion of the protected assembly to install or remove the sprinkler 100 from the fluid supply pipe fitting. In addition, the protective cap 300 cooperates with the support cup 200 and a tool(s) in a manner that permits the protective cap to be selectively removed from the assembly 10 in order to place a connected sprinkler in a preferred concealed service arrangement.

Figure 1B:
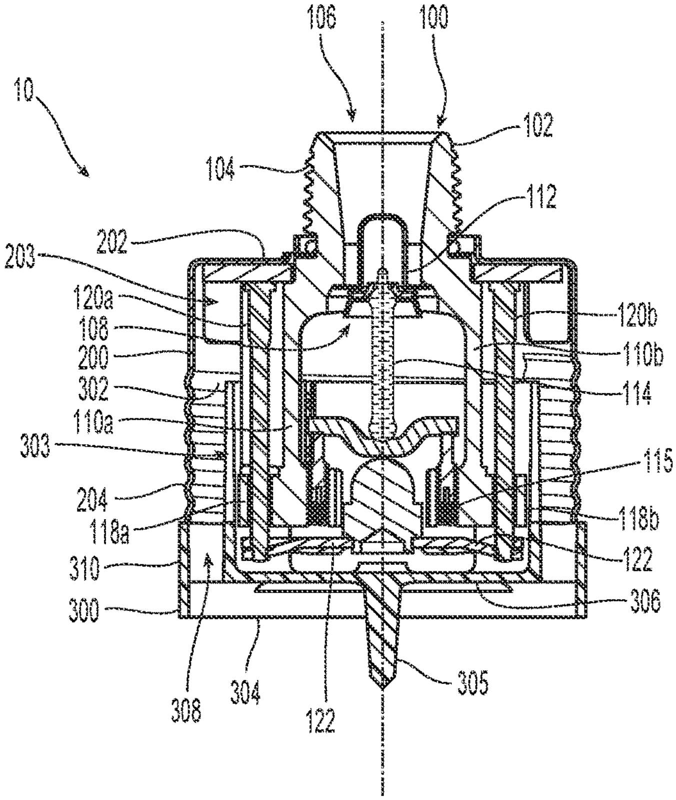
FIG. 1B is a cross-sectional view of the assembly of FIG. 1A.

With reference to FIG. 1B, the sprinkler 100 includes a frame 102 having a body 104 defining an inlet 106, an outlet 108 and an internal passageway extending along a sprinkler axis X-X from the inlet 106 to the outlet 108. The body 104 can include an external thread such as, for example, an external NPT thread for connection to a fluid supply pipe fitting. The frame can also include a pair of spaced apart frame arms 110*a*, 110*b* that are preferably diametrically opposed about the outlet 108 and extend axially away from the frame body 104 and the outlet 108. The sprinkler 100 of the protected sprinkler assembly 10 can be configured as an automatic sprinkler with an appropriate seal and trigger arrangement to control the discharge of firefighting fluid from the frame outlet. Alternatively, the sprinkler can be configured as a normally open sprinkler in which firefighting fluid delivered to the sprinkler inlet is freely discharged from the outlet. The sprinkler 100 shown in FIG. 1B is configured as an automatic sprinkler having, among its operational components, a seal assembly 112 supported in the outlet by a thermally responsive trigger 114 seated between the frame arms 110*a*, 110*b* and preferably aligned along the central sprinkler axis X-X. The trigger 114 is preferably embodied as a thermally responsive fluid filled frangible glass bulb that is thermally rated to rupture at an elevated nominal temperature to release the seal assembly 112 and actuate the sprinkler 100 for distribution of a firefighting fluid. The trigger 114 is preferably seated on a yoke or similar structure that bridges across the frame arms 110*a*, 110*b*, as seen for example, in U.S. Pat. No. 8,794,340 or U.S. Patent Application Publication No. 2017/0296852. Alternatively, the trigger can be seated on a trigger boss or apex (not shown) formed integrally with the frame arms 110*a*, 110*b* and centrally aligned along the sprinkler axis X-X. One or more compression screws 115 is threaded into a terminal portion of the frame arms 110*a*, 110*b* to provide a compression force that is transferred to the seal assembly 112 to seal the outlet 108.

Another operational component of the sprinkler 100 includes a fluid distribution member or deflector coupled to the sprinkler frame for distributing discharged firefighting fluid in a desired pattern for fire protection. The fluid distribution member can be spaced at a fixed distance from the sprinkler outlet 18 or alternatively can be located at a varying distance in a drop-down or sliding arrangement. Shown in FIG. 1B of the assembly 10 is an illustrative embodiment of the sprinkler 100 preferably embodied as a pendent sprinkler with a drop-down deflector or fluid distribution member coupled to the sprinkler frame 102 for installation in a concealed arrangement. Alternatively, the sprinkler 100 could be configured as a concealed horizontal sprinkler in which the deflector deploys horizontally in a sliding arrangement parallel to the floor or ceiling. Preferably formed at the terminal end of each frame arm 110*a*, 110*b* is a laterally extending cantilever 118*a*, 118*b*. Each cantilever formation 118*a*, 118*b* preferably extends laterally and outwardly with respect to the axially extending frame arm 110*a*, 110*b*. A through bore is formed in each cantilever 118*a*, 118*b* to house a pin 120*a*, 120*b* in a sliding engagement. Affixed to the sliding pins 120*a*, 120*b* is the fluid deflection member 122 to form the preferred operational component of a drop-down arrangement that includes a retracted position as shown in FIG. 1B in which the fluid deflection member 122 is located at first distance from the outlet 108. The drop-down arrangement also defines a deployed position in which the sliding pins locate the fluid deflection member 122 at a maximum distance from the outlet 108. In a preferred aspect, the terminal end of each frame arm 110*a*, 110*b* is located at a second distance from the outlet 108 that is equal to or less than the first distance of the retracted fluid deflection member 122. In an installed, service-ready concealed arrangement, the fluid deflection member 122 is supported in its retracted position by a thermally responsive cover plate assembly 500, as seen for example seen in FIG. 7B, secured to the support cup 200. In the preferred embodiment of the sprinkler 100, the through bores are preferably formed radially outside of the frame arms 110*a*, 110*b*.

Figure 2:
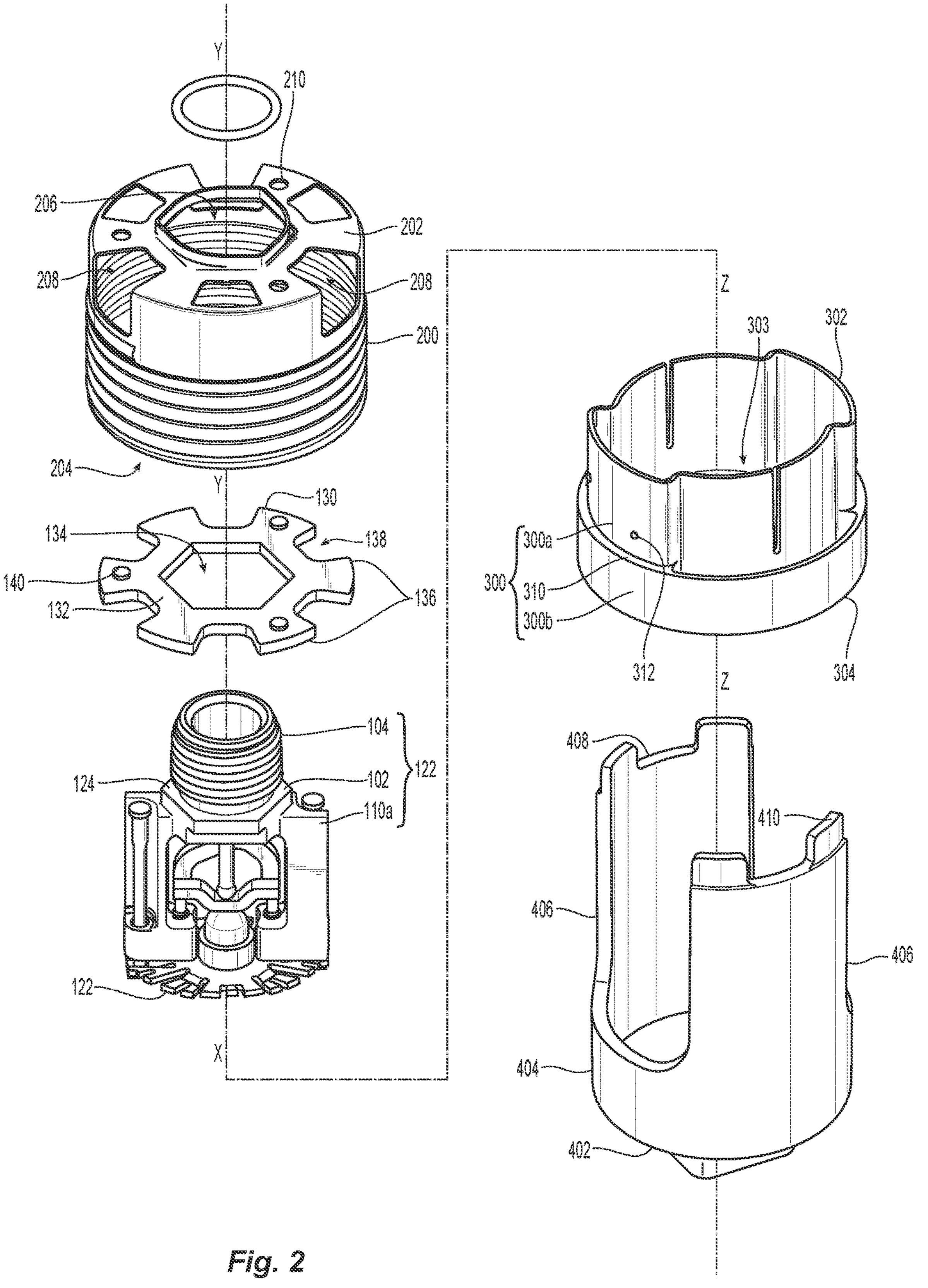
FIG. 2 is an exploded perspective view of a preferred embodiment of a tool used with the assembly of FIG. 1A.

Referring to FIGS. 1A, 1B and 2, portions of the sprinkler frame 102, operational components of the sprinkler 100, including the thermally responsive trigger 114 and the deflector member 122, are enclosed between the support cup 200 and a chamber 303 of the preferred protective cap 300. The support cup 200 is a generally cylindrical member that includes an end cap 202 and an open receiving end 204 opposite the end cap 202 to define a cup chamber 203 centered about a central cup axis Y-Y. The end cap 202 includes a central opening 206 that, with the open receiving end 204 of the cup 200, coaxially receives the sprinkler 100. Upon receipt of the sprinkler 100, the end cap 202 is disposed about the sprinkler body such that the cup 200 and its open receiving end 204 circumscribe the frame arms 110*a*, 110*b* and fluid deflection member 122 with the cup axis Y-Y coaxially aligned with the sprinkler axis X-X. In addition to the central opening 206, the end cap 202 preferably includes a group of apertures 208 arranged around the central opening 206 and more preferably radially disposed and angularly arranged about the cup axis Y-Y to provide visual access, access for tool and/or access for heat flow through the cup and sprinkler assembly. In preferred embodiments of the support cup 200, the apertures 208 are angularly spaced about the cup axis Y-Y to define an arc length about the cup axis Y-Y between two angularly adjacent spaced apertures 208. The preferred arc length can be defined by any respective spaced apart portions of the adjacent apertures 208. For example, the preferred arc length can be defined by the spaced apart centers of the adjacent apertures 208 or the preferred arc length can be defined by the spaced apart corresponding lateral edges of the adjacent apertures 208. One or more of the apertures 208 may be located exclusively on the end cap 202 or alternatively extend and wrap over into the wall structure of the support cup 200 proximate the end cap 202. The wall structure of the support cup 200 is preferably corrugated with alternating ridges and grooves defining, for example, a helical groove for engaging and supporting either the protective cap 300, as described herein, or a cover plate assembly in order to enclose the operational components of the sprinkler 100 therebetween.

Shown in FIGS. 1A, 1B, 2, and 3A-3D is a preferred embodiment of the protective cap 300 for engagement with the support cup 200 to protect the sprinkler 100 and its operational components while defining a tool path for sprinkler installation or removal tool. Generally, the preferred protective cap 300 includes an insertion end portion 300*a* that is inserted into the support cup and preferably engages an internal surface therein. The cap 300 also includes one or more slots 308 disposed peripherally about the insertion portion 300*a* for accessing a tool engagement path between the insertion portion 300*a* and the inner surface of the support cup. Additionally, the protective cap includes a shielding portion 300*b* preferably circumscribed about the one or more slots 308 to shield the slots 308 and the tool path to minimize or prevent debris or paint from entering the tool path through the slots 308. The preferred protective cap 300 also includes an internal baffle 306 that separates the insertion portion 300*a* and the shielding portion 300*b* and more preferably defines a cap chamber 303 for housing and protecting operational components of the sprinkler 100 such as, for example, the thermally responsive trigger 114 and the fluid deflection member 122 and more preferably, at least a portion of the frame arms 110*a*, 110*b*. Preferred embodiments of the protective cap 300 described herein are preferably formed from a polymer or plastic material such as, for example, polyethylene and formed by molding such as, for example, injection molding.

The protective cap 300 preferably includes a first insertion wall 302 at least partially circumscribed and centered about the central cap axis Z-Z to define the preferred insertion end portion 300*a*. Preferably, the internal baffle 306 is contiguous with the insertion wall 302 to define the preferred cap chamber 303 centered about the cap axis Z-Z for housing and protecting operational components of the sprinkler 100. When the protective device 300 is inserted into the support cup 200, the insertion wall 302 is preferably a single wall configured to engage the inner surface of the support cup 200 to secure the cap to the support cup 200 and also be radially spaced inward from the inner surface of the support cup to define the preferred tool path. Accordingly, the insertion wall preferably includes a first portion 302*a* located radially from the central cap axis Z-Z to engage the inner surface of the support cup 200 and a second portion 302*b* located radially from the central cap axis Z-Z so as to be radially spaced inward from the inner surface of the support cup 200 and define a preferred tool path. The preferred tool path is that space between the inner surface of the support cup 200 and the exterior surface of the insertion wall 302 in which a tool is manipulated to access tool engagement elements of the assembly 10. More preferably, as seen in FIG. 3B, the first portion 302*a* includes two diametrically opposed portions of the insertion wall 302 to define a first diameter D1 of the cap chamber 303 and the second portion 302*b* includes two diametrically opposed wall portions of the insertion wall 302 to define a second diameter D2 that is smaller than the first diameter. The insertion wall 302 can define alternate geometries in circumscribing the central cap axis Z-Z provided the wall engages the support cup and provides for the tool path.

With reference to FIG. 2, the first portions 302*a* of the insertion wall 302 engages the inner surface of the support cup 200 upon insertion of the protective cap 300 into the open end 204 of the support cup 200 to support the protective cap 300 therein. The outer surface of the insertion wall preferably forms an interference engagement with the inner surface of the support cup 200 to maintain the engagement between the support cup 200 and protective cap 300 during storage, shipping, handling, installation of the sprinkler 100 and when waiting to be put the sprinkler into service. Preferred embodiments of the protective cap 300 include one or more projection members 312 that engage the preferably corrugated wall of the support cup 200 to secure the protective cap 300 to the support cup 200 in a preferred frictional or interference engagement. In a preferred embodiment, a plurality of projection members 312 is helically arranged along the outer surface of the first portion 302*a* of the insertion wall 302 for engaging the corrugated inner surface of the support cup 200. The projections members 312 are shaped to engage the recesses or grooves of the corrugated inner surface of the support cup and resist disengagement of the components under the force of gravity or under minor contact. More preferably, the projection members 312 are shaped to maintain the engagement between the cap 300 and the support cup 200 to require manual rotation and/or axial displacement by hand in order to separate the components. The projection member 312 is preferably formed with a base portion integral with the insertion wall 302 with the remainder of the projection member extending radially for engagement with the support cup 200. The area of the base can be of uniform length and height, relative to the cap axis Z-Z, having the length circumferentially about the cap axis Z-Z that is equal to the height of the base in a direction parallel to the cap axis Z-Z. For example, as shown in FIGS. 3A-3D, the uniform base of the projection member 312 can be formed to be a circular base or a square base. The remainder of the projection member extends radially to a sufficient depth within the corrugation recesses to form the preferred frictional engagement with the support cup 200. The remainder of the projection member can radially extend and terminate to form any geometry to complimentarily engage the support cup 200. For example, the projection member 312 can radially extend to define a conical formation, a parabolic formation, a hemispherical formation, a circular cylinder or a square cylinder.

Shown in FIGS. 3E-3H is another embodiment of the protective cap 300 having an alternate embodiment of the projection members 312' in which the projection members 312' has a base with a non-uniform length and height, relative to the cap axis Z-Z, For example, as shown, the projection member 312' can have an elongated base in which the length circumferentially about the cap axis Z-Z is greater than the height of the base in a direction parallel to the cap axis Z-Z. Each prism projection member 312' preferably circumferential spans an angle about the cap axis θ that can range for example, from 10 degrees to 20 degrees; although the projection member 312' can circumferentially span an angle greater or smaller outside that range. With the preferred elongated base, the remainder of each of the projection members 312' extends radially to form a prism member. The remainder of the projection member 312' can radially extend and terminate to form any geometry to complimentarily engage the support cup 200. For example, as shown in the cross-sectional views of FIGS. 3G and 3H, the prismatic projection member 312' can extend radially and terminate to define a parabolic or triangular cross-section. Alternatively, the projection member 312 can extend radially and terminate to define a prism with a semi-circular cross-section, trapezoidal cross-section, a rectangular cross-section or a square cross-section. The projection members 312' are preferably helically arranged along the outer surface of each first portion 302*a* of the insertion wall 302 at a pitch that corresponds to the corrugated inner surface of the support cup 200.

As shown, the insertion wall 302 extends parallel to the cap axis Z-Z to terminate at a first terminal end 301*a* of the protective cap 300. Alternatively, the insertion wall 302 or a portion thereof can vary its radial distance to the central axis Z-Z over its length. More preferably, the first portion 302*a* of the wall tapers toward the central cap axis Z-Z. Additionally, or in another alternative embodiment, the insertion wall 302 includes one or more cut outs or notches 313 that extend preferably axially from the first terminal end 301 toward the shielding end portion 300*b*. The notches 313 are preferably located along the second portion 302*b* of the insertion wall 302 and define an axial length and width sufficient to drain the cup chamber of any liquid that may build up in the chamber and otherwise contact operational components of the sprinkler 100.

Figure 3A:
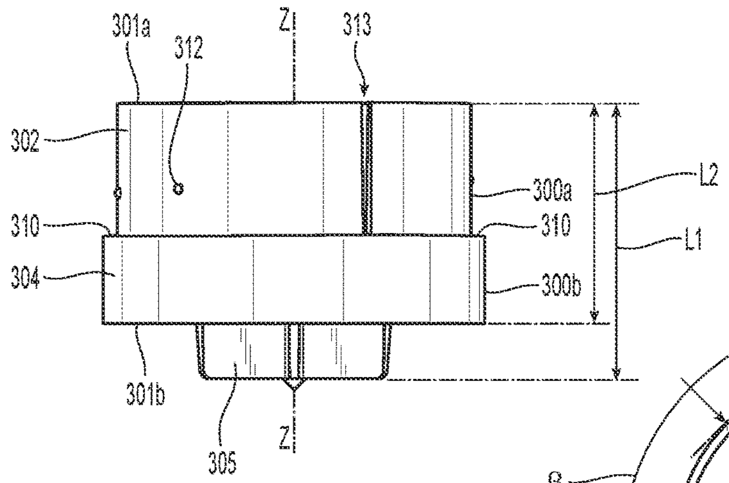
FIGS. 3A-3D are various views of a preferred embodiment of a protective cap for use in the assembly of FIG. 1A.
Figure 3B:
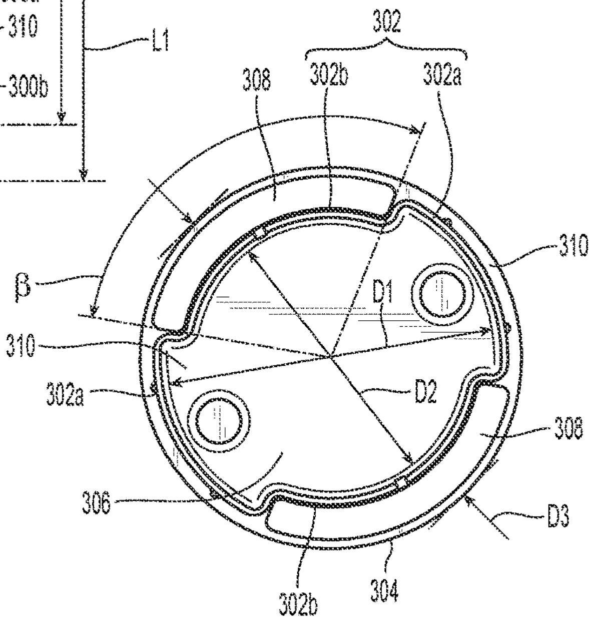

Formed between the insertion end portion 300*a* and the shielding end portion 300*b* is one or more external shelves 310 and more preferably two shelves 310, as seen in FIGS. 3A and 3B to ensure and confirm full engagement between the support cup 200 and the protective cap 300. In the preferred assembly 10, the cap 300 is inserted into the support cup 200 until the external shelf 310 contacts or abuts the open receiving end 204 of the support cup 200 to prevent further advancement and preferably locate the first end 301*a* of the cap 300 at the preferred fixed distance from the apertures 208 in the end cap 202 of the support cup 200. Accordingly, the cap 300 is preferably configured to locate the insertion wall 302 and its terminal end 301*a* with respect to the end cap 202 of the support cup 200 to define a preferred fixed distance therebetween. The shielding end portion 300*b* preferably externally extends below or beyond the support cup 200 proximate the receiving end 204 of the cup. Preferably, each cup engagement shelf 310 spans an arc about the central cup axis Z-Z that ranges from 60-80 degrees.

Preferably formed outside the cap chamber 303 and peripherally to the insertion wall 302 are one or more slots 308 in fluid communication with the preferred tool path of the assembly 10 to provide a portal through which a tool can gain access to the preferred tool path of the assembly 10. More preferably, a tool inserted through the slots 308 can be navigated within the internal volume of the assembly 10 to engage tool engagement elements of the assembly 10 and preferably extend through the apertures 208 of the support cup 200. In the preferred cap 300, the one or more slots 308 extend between the preferred pair of diametrically opposed cup engagement shelves 310.

In a preferred configuration of the internal slots 308, each of the preferred slot(s) 308 is arcuate and preferably of a closed-form, as seen in FIG. 3B, that has a preferred slot length spanning over an arc of over 90 degrees with respect to the central cap axis Z-Z, preferably spanning between 90 degrees to 120 degrees and more preferably spanning between 100-110 degrees. Alternatively, the slot length of slot 308 can span over an arc of over 120 degrees, for example, ranging between over 120 degrees and 180 degrees, and even more preferably ranging between 160-180 degrees. In an embodiment, the slot(s) 308 additionally or alternatively define a slot length spanning an arc length R that is preferably greater than the arc length θ defined between two adjacent apertures 208 of the support cup 200.

Preferably formed axially adjacent the insertion end portion 300*a* and the first wall 302 is the shielding end portion 300*b*. In one preferred aspect, the shielding end portion 300*b* is formed with respect to the insertion end portion 300*b* to define the preferred shelves 310 and the preferred slots 308. The shielding end portion 300*b* preferably includes a second wall 304 at least partially circumscribed and more preferably completely circumscribed about the cap axis Z-Z. The shielding wall 304 is preferably circular defining a diameter D3 greater than the one or more diameters D1, D2 of the insertion end portion 302. The preferred diameter D3 of the shielding wall 304 is sufficiently larger than the first diameter D1 of the first wall portion 302*a* of the insertion wall 302 such that the axially contiguous and axially adjacent shielding wall 304 and first portion 302*a* of the insertion wall 302 define the preferred shelves 310 therebetween. Moreover, the preferred diameter D3 of the shielding wall is sufficiently larger than the second diameter D2 of the second wall portion 302*b* of the insertion wall 302 such that the shielding wall 304 and first portion 302*a* are radially spaced apart to define the slots 308 therebetween which is wide enough to permit the insertion of an installation and/or removal tool and access the tool path. In preferred embodiments, the slots 308 are preferably closed-formed slots. The shielding wall 304 alone or in combination with the internal baffle 306, shields and protects the sprinkler 100 and the internal surfaces of the support cup 200 from accidental impact or external elements such as for example, paint spray. Moreover, the shielding wall 304 peripherally circumscribe or border the slots 308 to prevent or minimize external elements from entering the slots 308 and the preferred tool paths of the cap 300.

Figure 3C:
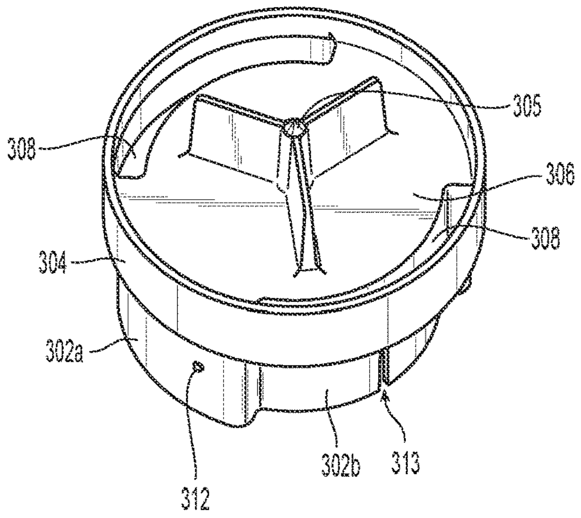
Figure 3D:
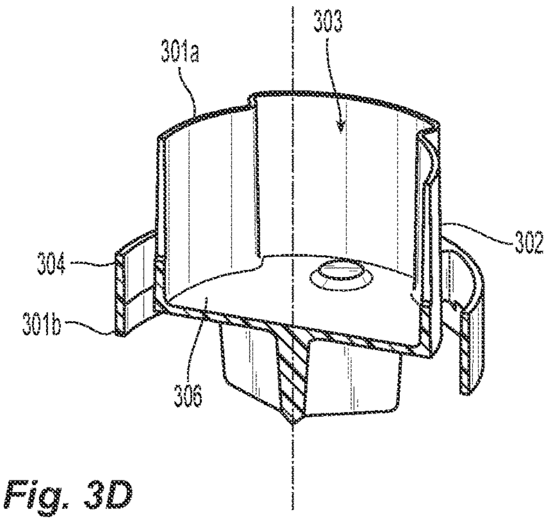
Figure 3E:
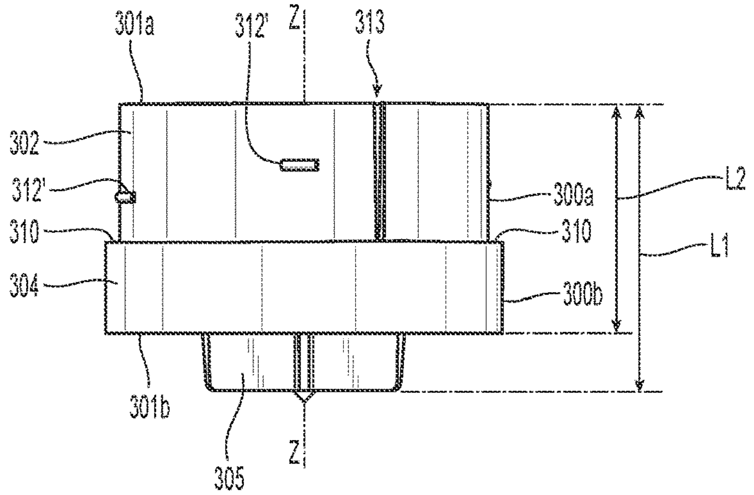
FIGS. 3E-3F are various views of another preferred embodiment of a protective cap for use in the assembly of FIG. 1A.
Figure 3F:
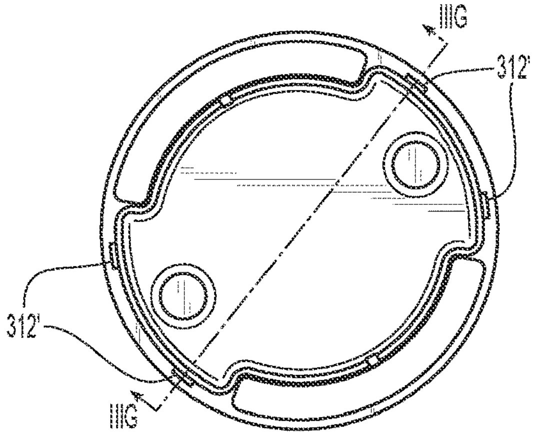
Figure 3G:
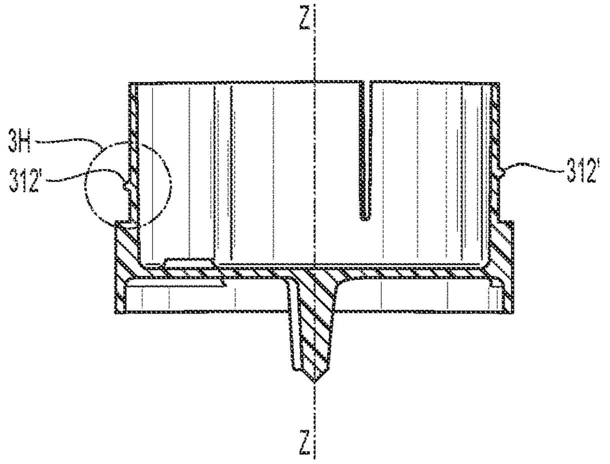
FIG. 3G is a cross-sectional view of the protective cap in FIG. 3F along line IIIG-IIIG.
Figure 3H:
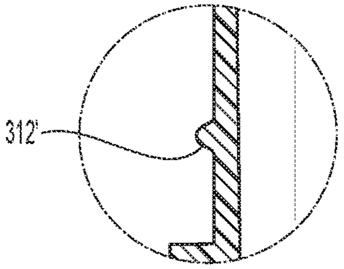
FIG. 3H is a detailed view of the protective cap shown in FIG. 3G.

The shielding wall 304 extends axially below or away from the insertion wall 302*a* to define or form a second terminal end 301*b* of the cap 300. Accordingly, the baffle 306 is preferably located between the first and second terminal ends 301*a*, 301*b* of the cap 300 as seen in FIG. 3D. To facilitate handling of the cap 300, a preferably central handle portion 305 extends externally from baffle 306 and axially through the shielding end portion 300*b*. With particular reference to FIG. 3A, in preferred embodiments of the cap 300, the handle portion 305 extends axially below or beyond the second terminal end 301*b* of the shielding end portion 300*b*. In such preferred embodiments where the cap 300 defines a total length L1, the first and second ends 301*a*, 301*b* of the cap 300 define an axial length L2 therebetween. Preferably, the wall length L2 is at least 50% of the total cap length L1, more preferably 75% or more of total cap length to define a preferred ratio of cap length-to-wall length (L1:L2) of 1.3:1. The handle portion 305 facilitates manipulation of the cap 300 into engagement with the support cup 200. Moreover, preferred embodiments of the cap 300 with a sufficient portion of the handle 305 exposed outside of the cap wall 304, the cap 300 can be removed from the support cup 200 without use of a removal tool as described herein. In a preferred embodiment, the handle 305 includes a group of fins joined to one another at and angularly arranged about the central cap axis Z-Z. More preferably, as seen in FIG. 3C, the handle preferably includes three fins. One fin is preferably aligned along a bisecting plane centered between the two slots 308 and the two other fins are preferably angled with respect to the first fin.

Figure 4A:
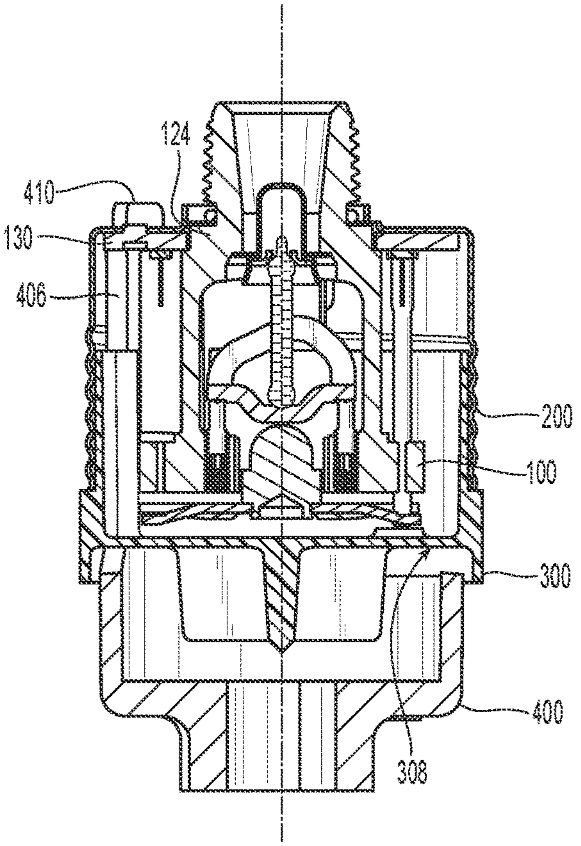
FIGS. 4A-4B are various cross-sectional views of the sprinkler assembly and tool of FIG. 2.
Figure 4B:
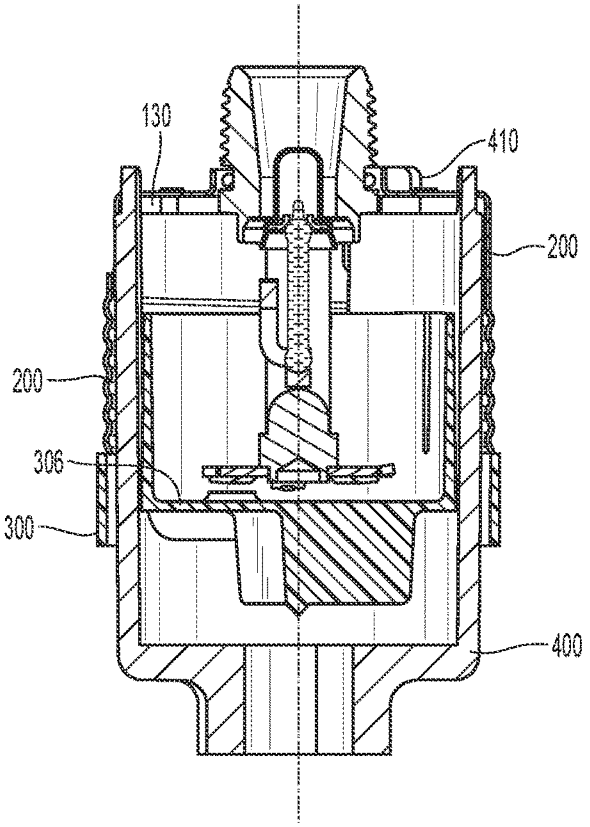
Figure 5A:
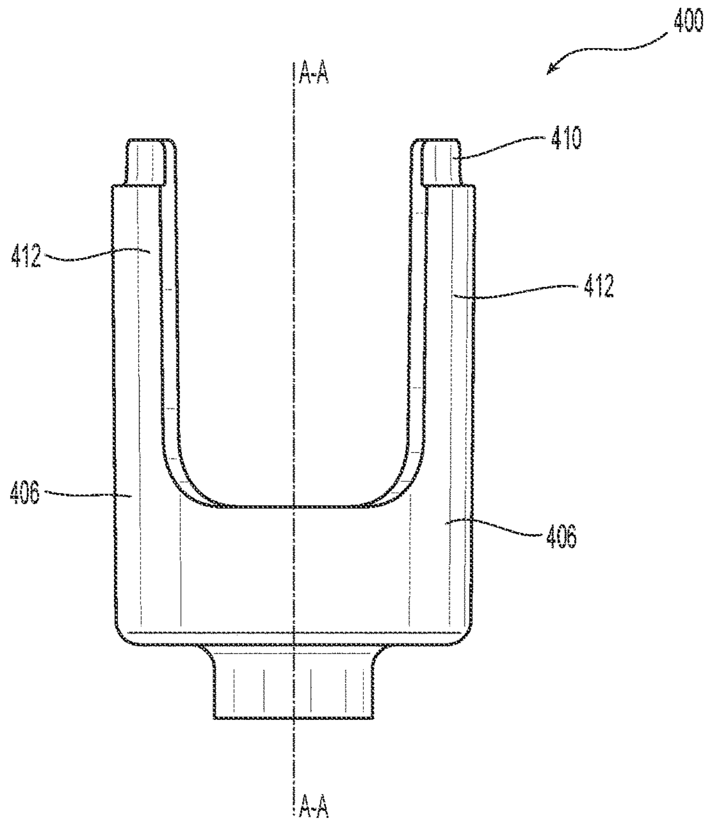
FIGS. 5A-5B are various views of the preferred embodiment of the tool used in FIGS. 4A-4B.
Figure 5B:
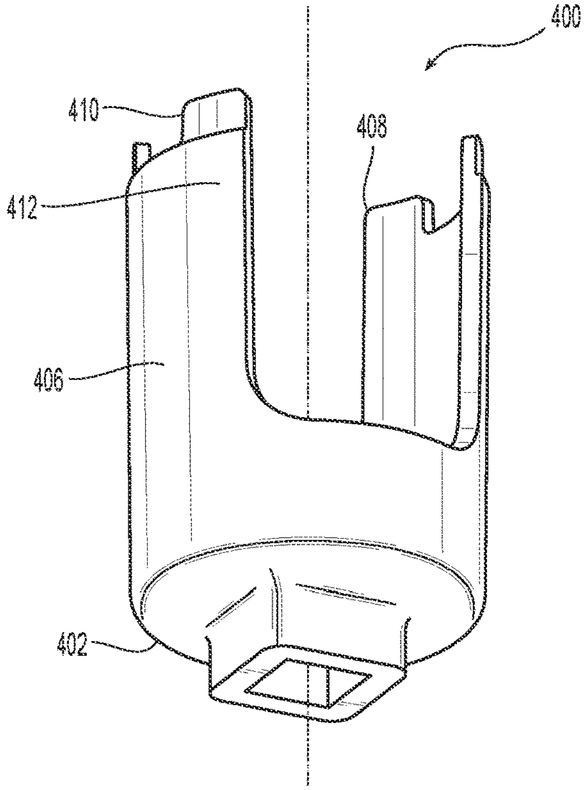

The protective cap 300 facilitates installation of the sprinkler 100 by remaining in place to protect the operational components of the sprinkler 100 while permitting access of associated tools to couple to or decouple the sprinkler from fluid supply piping and remove the cap 300 to place the sprinkler 100 into service. Illustrated in FIGS. 4A-4B is a tool 400 that is inserted into the protected assembly 10 through the internal slots 308 of the protective cap 300 along the preferred defined tool path to access tool engagement portions 124, 130 of the sprinkler 100. The inserted tool 400 extends into the preferred internal volume between the sprinkler 100 and the protective cap 300 to access or engage the tool engagement portions 124, 130 and preferably extend through the end cap 202 of the support cup 200. With reference to FIG. 2, the frame 102 includes a tool engagement portion 124 disposed or formed about the frame body between the body 104 and the frame arms 110*a*, 110*b*. The tool engagement portion 124 includes two or more flat surfaces for engagement by a tool, such as for example, a sprinkler wrench. More preferably, the tool engagement portion 124 includes a driver member 130 disposed about the sprinkler body 104 and the flats of the tool engagement portion 124 for engagement by the sprinkler wrench or other tool to connect or disconnect the sprinkler 100 from a fluid supply pipe.

The driver member 130 preferably includes a disc member 132 with a central collar or opening 134 having internal flats for surface engagement with the flat surfaces of the sprinkler frame body 104. The driver member 130 further includes a plurality of spaced apart fins 136 extending radially from the central collar 134 to define tool engagement slots 138 therebetween. An appropriate tool, such as for example a sprinkler wrench, can engage the slots 138 of the driver member 130 to apply a torque to the sprinkler 100 to connect or disconnect the sprinkler 100 from a fluid supply pipe. Axial extending projections or nubs 140 of the driver member are received in corresponding axially aligned receiving openings 210 of the support cup 200 to interlock the support cup 200 with the driver member 130 and align the tool engagement slots 138 of the driver member 130 with the apertures 208 of the end cap 202 of the support cup 200. Accordingly, rotation of the driver member 130 with an appropriate tool engaged in the tool engagement slots 138 of the driver member 130 will rotate the support cup 200 and the engaged protection cap 300.

The preferred constructions of the protective cap 300 and its engagement with the support cup facilitate easy insertion and manipulation of tools into the protected sprinkler assembly 10. Unlike known sprinkler protection caps, the preferred cap 300 and its inserted end portion 302 is axially spaced from the apertures 208 of the end cap 202 of the support cup 200 thereby avoiding alignment and interference problems between the components when inserting installation tools into the assembly 10. Moreover, the preferred slot 308 configurations of the protective cap provide flexibility in rotating tools within the protected assembly 10 to facilitate either sprinkler installation or removal of the protective cap 300. In the preferred embodiments of the cap 300 having the preferred arcuate slots 308 and arc lengths as previously described, each individual slot 308 preferably axially overlaps and/or aligns with more than one adjacent tool engagement slots 138 of the driver member 130 and/or more than one aperture 208 in the support cup 200. Accordingly, each individual slot 308 preferably axially overlaps and/or aligns with more than one and preferably at least two adjacent tool engagement slots 138 or fractions thereof of the driver member 130 and/or at least two apertures 208 or fractions thereof in the support cup 200. In other preferred embodiments, each individual slot 308 preferably axially overlaps and/or aligns with more than two adjacent tool engagement slots 138, or fractions thereof, of the driver member 130 and/or more than two apertures 208, or fractions thereof, in the support cup 200. The preferred axial overlap and/or alignment of slots 308 and apertures 138, 208 can provide additional flexibility in which to navigate the tool 400.

With reference to FIGS. 2, 4A-4B, and 5A-5B, shown is one preferred embodiment of the tool 400 configured as a sprinkler wrench. The tool has a first end 402 forming a base 404 and a group of spaced apart extension members 406 extending axially from the base 404 about the central axis to form the opposite second end 408. The base 404 of the tool 400 and alternate embodiments thereof can be configured to receive a handle (not shown) for applying a force to the tool. More preferably, the tool 400 includes a pair of extension members 406 opposed about the base 404. In use, the tool 400 is inserted through the shielding end portion 300*b* of the protective cap 300 so that each extension member 406 extends through one slot of the protective cap slots 308 and along the preferred tool path. Moreover, each extension member 406 defines a width that is preferably less than the slot length of the protective cap slots 308 to permit rotation of the tool 400 with respect to the protective cap 300. The extension members 406 are preferably arcuate about coaxially aligned central axes with the protective cap 300. Accordingly, where the slots 308 of the protective cap 300 is defined by a first arc length, the width of each extension member 406 defines a preferred second arc length that is less than the first arc length. In a particular preferred embodiment, the second arc length defined by the extension members 406 is at least 60% of the first arc length of the protective cap slots 308. Preferred embodiments of the tool 400 include one or more projections 410 protruding axially from the end of each extension member 406. The projection 410 is preferably sized and configured to engage the tool engagement slots 138 of the preferred driver member 130 previously described for rotation of the protected assembly 10 during installation or decoupling of the assembly 10 from a pipe fitting. In preferred embodiments, two projections 410 of each extension member 406 are preferably configured and spaced to correspondingly engage two angularly adjacent spaced tool engagement slots 138 of the driver member 130, as illustrated in FIGS. 4A and 4B. Moreover, the two projections 410 of each extension member 406 are preferably configured and spaced to correspondingly engage two angularly adjacent spaced apertures 208 of the support cup 200. By configuring the protective cap slots 308 with the preferred arc lengths, the tool 400 can be adjusted, including rotatably adjusted, within the protective cap 300 to properly locate and engage the driver member 130.

Figure 6A:
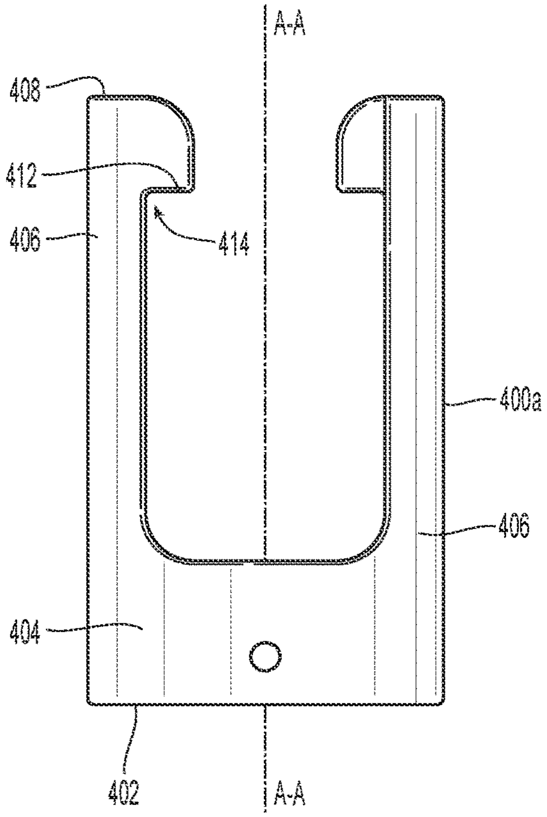
FIGS. 6A-6B are various views of another preferred embodiment of a tool for use with the assembly of FIG. 1A.
Figure 6B:
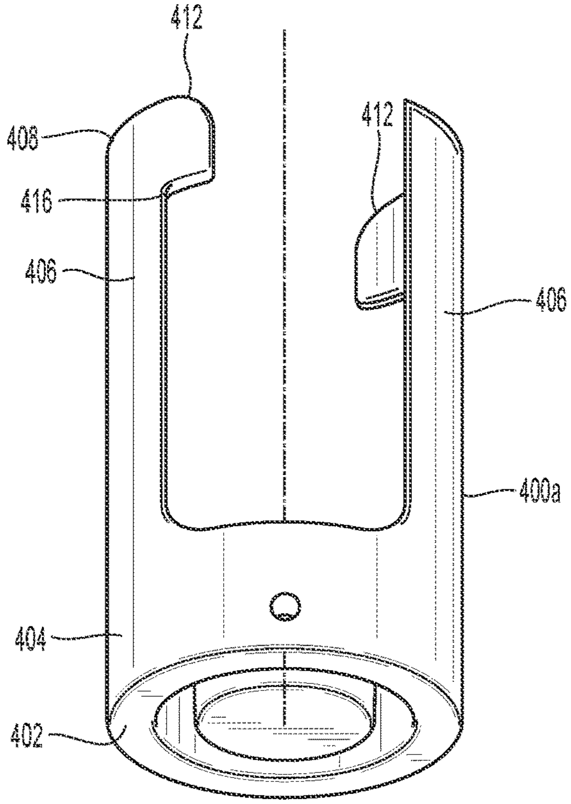
Figure 6C:
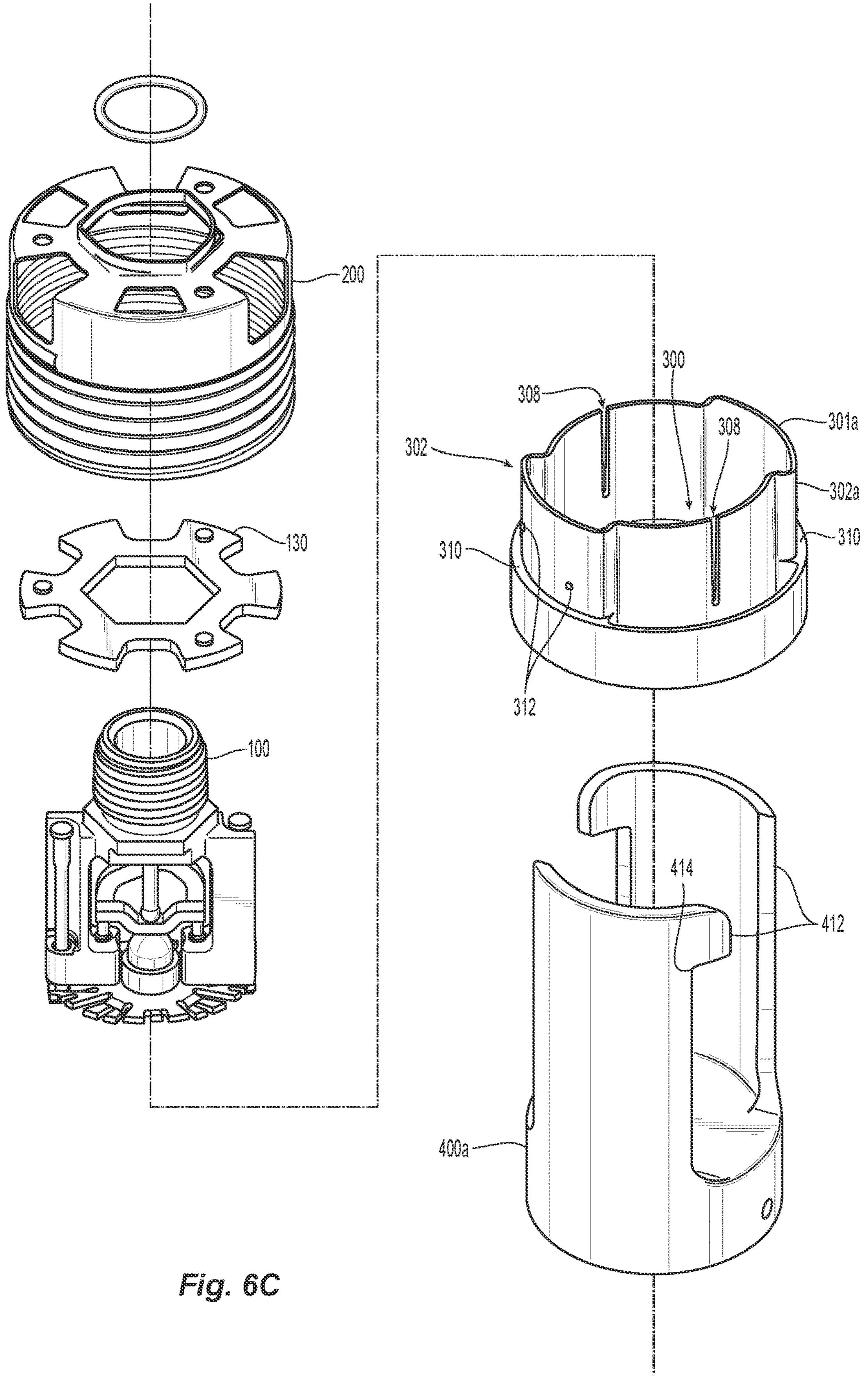
FIG. 6C is an exploded perspective view of a preferred embodiment of the tool of FIGS. 6A-6B used with the assembly of FIG. 1A.

Alternative tools can be provided to remove the protective cap 300 from the assembly 10. Shown in FIGS. 6A-6C is another tool 400*a* that is configured exclusively for removing the protective cap 300. The preferred removal tool 400*a* includes one or more laterally extending projections 412 to preferably form a corresponding number of notches 414, 416 for engaging the insertion wall 302 of the preferred protective cap 300. More specifically, the embodiment of the tool 400*a* shown in shown in FIG. 6C, defines a preferred height so that its engagement notch 414, 416 preferably engages the first terminal end 301*a* of the first portion 302*a* of the insertion wall 302 of the protective cap 300 but not the end cap 202 of the support cup 200. Accordingly, when the extension members 406 are inserted into the protected assembly 10 through the preferred closed-form slots 308, the end 408 of the tool 400*a* is axially located between the end cap 202 of the support cup 200 and the terminal end 301*a* of the protective cap 300. The tool 400*a* is then rotated within the slots 308, preferably counter-clockwise, to bring the notch 414 into a preferred surface engagement with the terminal end 301*a* of the first portion 302*a* of the insertion wall 302. To remove the cap 300 from the support cup 200, the tool 400*a* can be pulled axially from the base 404 to separate the cap 300 from the support cup 200.

Figure 7A:
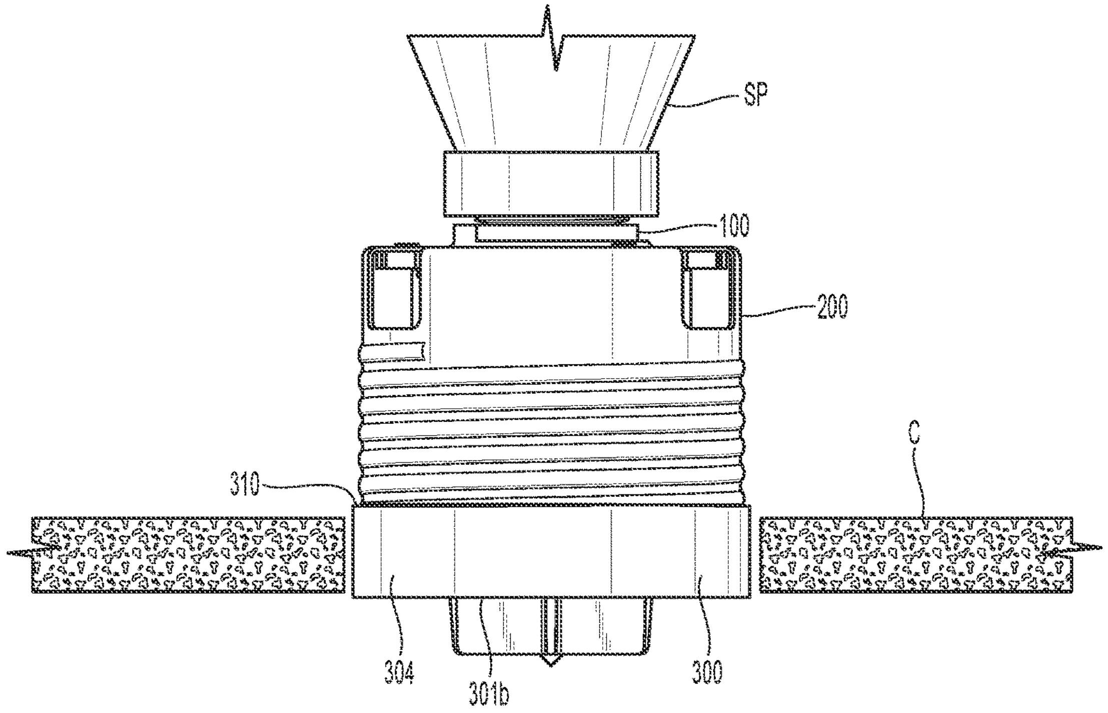
FIG. 7A is an installed elevation view of the assembly of FIG. 1A.
Figure 7B:
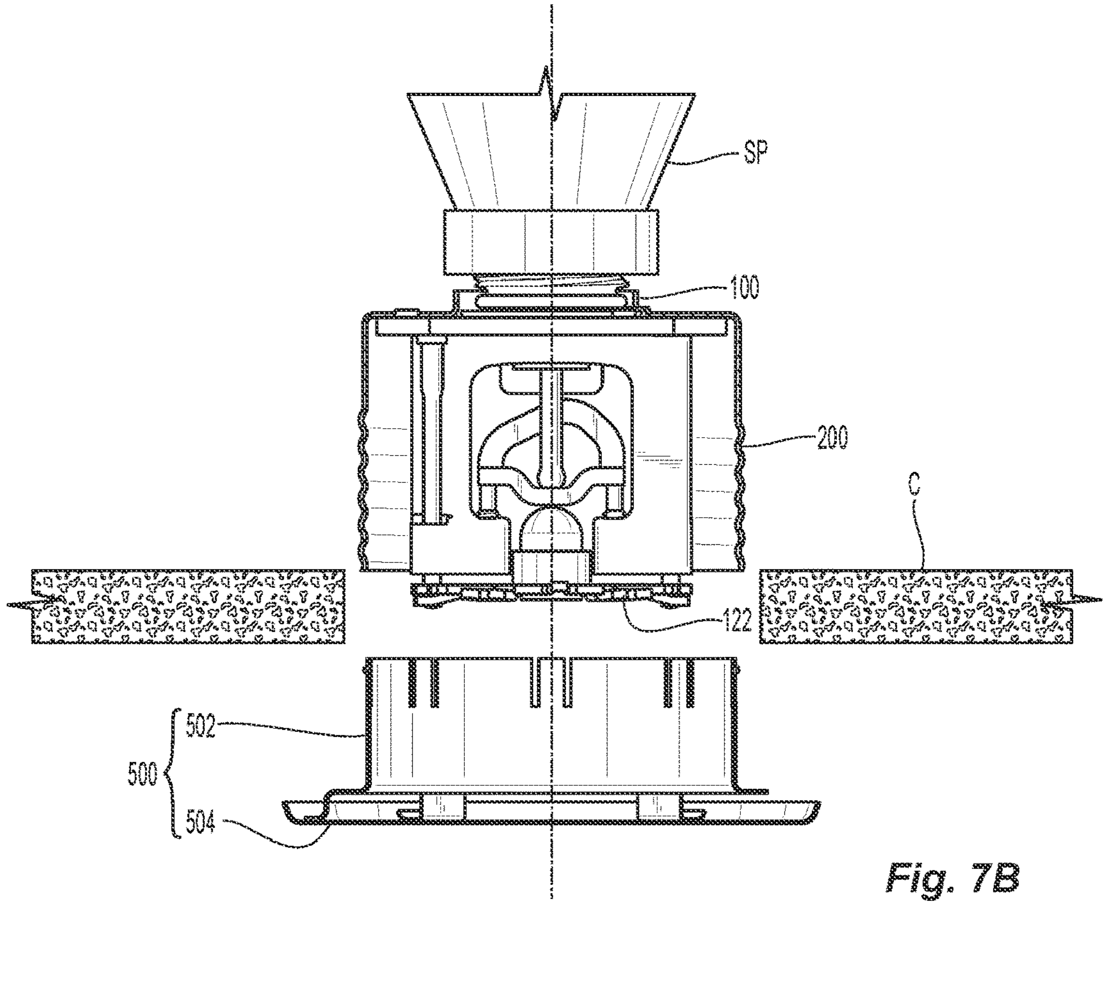
FIG. 7B is an exploded installed elevation partial cross-sectional view of the sprinkler used in the assembly of FIG. 1A ready for service as a concealed sprinkler.

Schematically shown in FIG. 7A is the protected sprinkler 10 installed within a through hole of a ceiling C with the sprinkler frame 102 coupled to a fluid supply pipe fitting SP and the protective cap 300 extending below the ceiling C. As described herein, the sprinkler 100 can be coupled to a fluid supply pipe using an installation tool 400 with the protective cap 300 remaining in place. Moreover, the protective cap 300 can remain in place while the sprinkler 100 awaits to be placed into service. Shown in the exploded view of FIG. 7B is the connected sprinkler 100 in a concealed arrangement. With the protective cap 300 removed using, for example the tool 400*a*, the fluid deflection member 122 is supported in a retracted position by a thermally responsive cover plate assembly 500 secured to the support cup 200. The cover plate assembly 500 preferably includes a retainer ring 502 having a flange for mounting against the ceiling C. A cover plate 504 is connected to the retainer ring 502 using a thermally responsive soldered connection. In the presence of a sufficient level of heat, the cover plate 504 falls away from the sprinkler removing its support of the fluid deflection member 122 and letting it fall to its fully deployed operational position.

The preferred cap 300 can also be used as an installation guide to facilitate proper location of the fluid deflection member 122. The handle 305 preferably includes a centering point that can be used to mark the drywall ceiling C. The centering mark defines a center to form a preferred through hole for the sprinkler assembly. In one preferred embodiment of the cap 300 with a shielding wall 304 as shown, the through hole formed in the ceiling C has a preferred diameter of about 2¼ in to 2½ in to accommodate the protected sprinkler assembly 10 and the deployment of the fluid deflection member 122. Moreover, the shielding wall 304 can properly axially locate the sprinkler 100 and its fluid deflection member 122 with respect to the bottom or exposed surface of the ceiling. In particular, the preferred shielding wall 304 defines a preferred minimum deployment distance of the fluid deflection member 122 with respect to the lower or exposed surface C when the second terminal end 301*b* is located flush with the ceiling surface. Alternatively, or additionally, the preferred shielding wall 304 defines a preferred maximum deployment distance of the fluid deflection member 122 with respect to the lower or exposed surface C when the shelf 310 is located flush with the lower or exposed surface of the ceiling C.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A protected sprinkler assembly comprising:

a fire protection sprinkler including a frame and a fluid deflector coupled to the frame, the frame having a body defining an inlet, an outlet and an internal passageway extending along a sprinkler axis from the inlet to the outlet, the sprinkler including a trigger assembly with a thermally responsive element extending between the outlet and the fluid deflector;

a support cup having an end cap with a central opening and a plurality of apertures radially arranged about the central opening with the support cup including an open receiving end opposite the end cap and a wall structure having an internal surface extending between the end cap and the open receiving end to define a cup chamber centered about a central cup axis, the central opening being disposed about the body so that the support cup is centered about the frame; and a protective cap engaged with the support cup, the protective cap including:

an insertion end portion extending to a terminal end of the protective cap spaced from the end cap and having a first wall centered and at least partially circumscribed about a central cap axis to define a first diameter and a first end of the protective cap; the first wall having a first portion and a second portion;

a shielding end portion having a second wall centered and circumscribed about the cap axis to define a second end of the cap and a second diameter greater than the first diameter, the second wall being axially adjacent the first portion of the first wall to define at least one cup engagement shelf and axially adjacent the second portion of the first wall to define at least one slot peripheral to the first wall and radially between the first wall and the second wall; and an internal baffle disposed perpendicular to the central cap axis separating the insertion end portion and the shielding end portion, the internal baffle being contiguous with the first wall to define a cap chamber centered about the cap axis, the protective cap being engaged with the support cup with the insertion end portion within the cup chamber to house the fluid deflector and the thermally responsive element within the cap chamber between the internal baffle of the protective cap and the end cap of the support cup and to locate the second portion of the first wall radially inward of the internal surface of the support cup to define a tool path between the second portion of the first wall and the internal surface of the support cup.

2. The assembly of claim 1, wherein the at least one cup engagement shelf contacts the open receiving end of the support cup so as to limit the insertion of the insertion end portion within the cap chamber; and the first portion of the first wall is engaged with the internal surface of the support cup to retain the protective cap to the support cup with the at least one slot providing tool access from the shielding portion to the tool path between the second portion of the first wall and the internal surface of the support cup.

3. The assembly of claim 2, wherein the first portion of the first wall engaged with the internal surface of the support cup includes at least one projection member and the internal surface includes a groove, the at least one projection member being engaged with the groove.

4. The assembly of claim 3, wherein the at least one projection member includes a plurality of projection members angularly and axially spaced from one another.

5. The assembly of claim 4, wherein the first portion of the first wall includes a pair of wall portions diametrically opposed about the central cap axis, each of the pair of wall portions comprises the plurality of projection members for engaging the groove of the support cup, the plurality of projection members being helically arranged about the central cup axis.

6. The assembly of claim 5, wherein each projection member in the plurality of projection members has a uniform base integrally formed with the first portion of the first wall, each projection member extending radially from the first portion of the first wall.

7. The assembly of claim 5, wherein each projection member in the plurality of projection members has an elongated base integrally formed with the first portion of the first wall and extending circumferentially about the cap axis, the projection member extending radially from the first portion of the first wall.

8. The assembly of claim 1, wherein the second portion of the first wall includes a pair of wall portions diametrically opposed about the central axis, each wall portion of the second portion including an axially extending notch from the first end of the protective cap for draining the cap chamber.

9. The assembly of claim 1, wherein at least one of the first portion and the second portion of the first wall at the first end of the protective cap tapers toward the central cap axis.

10. The assembly of claim 1, wherein the at least one cup engagement shelf includes a pair of cup engagement shelves diametrically opposed to one another about the insertion portion, each shelf spanning an arc spanning about a center along the cap axis.

11. The assembly of claim 10, wherein each cup engagement shelf spans an arc ranging from 60-80 degrees.

12. The assembly of claim 10, wherein the at least one slot extends between the pair of diametrically opposed cup engagement shelves.

13. The assembly of claim 1, wherein the at least one slot includes a pair of slots diametrically opposed about the first wall, each slot spanning an arc spanning about a center along the cap axis.

14. The assembly of claim 13, wherein each slot spans an arc ranging from 90 degrees to 120 degrees.

15. The assembly of claim 1, wherein the plurality of apertures of the support cup are angularly arranged about the central opening of the end cap and the cup axis to define a first arc length about the cup axis between two angularly adjacent spaced apertures; and wherein the at least one slot of the protective cap defines a slot length spanning a second arc length about the central cap axis that is greater than the first arc length between the two angularly adjacent spaced apertures of the plurality of apertures of the support cup.

16. The assembly of claim 1, wherein the first end and the second end of the protective cap are axially spaced apart to define a wall length of the insertion and shielding portions, the internal baffle including a central handle extending axially beyond the second end of the protective cap to define a total length of the protective cap, the wall length of the insertion and shielding portions being at least 50% of the total length of the protective cap.

17. The assembly of claim 1, wherein the frame includes a pair of frame arms and a tool engagement portion between the body and the frame arms; the fluid deflector being in a sliding arrangement with the pair of frame arms, the fluid deflector being coaxially aligned along the sprinkler axis having a retracted position located at a first position from the outlet and a deployed position located at a maximum distance from the outlet; the fire protection sprinkler being an automatic sprinkler having a seal assembly disposed within the outlet; and a thermally responsive trigger disposed between the outlet and the deflector to support the seal assembly within the outlet.

18. The assembly of claim 17, wherein the pair of frame arms are diametrically opposed about the outlet with the thermally responsive trigger assembly seated between the frame arms, each frame arm having a terminal end axially spaced from the outlet and formed as a laterally outwardly extending cantilever with a through bore formed therein.

19. The assembly of claim 17, wherein the plurality of apertures of the support cup extends from the end cap and into the wall structure of the support cup.

20. The assembly of claim 17, further comprising a tool engaged with the protective cap, the tool having a base forming a first end of the tool and a pair of spaced apart extension members extending axially from the base, wherein the at least one slot comprises a plurality of slots, the tool being inserted through the second end of the protective cap so that each extension member extends through one slot of the plurality of slots, each extension member including a projection for engaging the tool engagement portion of the sprinkler frame or the end cap of the support cup.

21. The assembly of claim 20, wherein the tool engagement portion includes a disc member with a central collar having internal flats for surface engagement with the body of the frame, the disc member including a plurality of spaced apart fins defining tool engagement slots therebetween axially aligned with the apertures of the support cup, each slot in the plurality of slots of the cap axially overlapping more than one of the tool engagement slots.

22. The assembly of claim 20, wherein the tool includes a plurality of projections extending laterally about the extension members to form a notch therebetween, rotation of the tool with respect to the protective cap engages the tool with a terminal end of the protective cap for removal of the protective cap from the support cup.

23. A method of protecting a sprinkler assembly having a frame, a fluid deflector, a thermally responsive trigger and a support cup having an end cap with a central opening centered about a cup axis and disposed about the sprinkler frame, the end cap including a plurality of apertures angularly spaced about the central opening to define an arc length about the cup axis between two angularly adjacent spaced apertures, the method comprising:

engaging a first portion of an insertion wall of a protective cap with the support cup to space a terminal end of the protective cap from the end cap and house the thermally responsive trigger and fluid deflector within a cap chamber defined by a first wall at least partially circumscribed about a central cap axis; and defining a tool path between a second portion of the insertion wall and the support cup that is axially accessible by a closed-formed slot located outside the cap chamber and peripheral to the first wall.

24. The method of claim 23, further comprising shielding the closed-formed slot with a second wall circumscribed about the central cap axis.

25. The method of claim 23, further comprising inserting a tool along the tool path through the slot, the slot including a plurality of slots defined by a pair of arcuate slots each formed peripherally to the insertion wall and proximate the second portion of the first wall.

26. The method of claim 23, wherein the engaging includes abutting an external shelf of the protective cap formed between the insertion wall and a shielding wall of the protective cap.

27. The method of claim 23, wherein the engaging includes engaging projection members formed on the first portion of the insertion wall with a helical groove formed internally on the support cup.

* * * * *